(12) United States Patent
Tierney et al.

(10) Patent No.: US 7,395,374 B2
(45) Date of Patent: Jul. 1, 2008

(54) SYSTEM AND METHOD FOR CONFLICT RESPONSES IN A CACHE COHERENCY PROTOCOL WITH ORDERING POINT MIGRATION

(75) Inventors: Gregory Edward Tierney, Chelmsford, MA (US); Stephen R. Van Doren, Northborough, MA (US); Simon C. Steely, Jr., Hudson, NH (US)

(73) Assignee: Hewlett-Packard Company, L.P., Houston, TX (US)

( * ) Notice: Subject to any disclaimer, the term of this patent is extended or adjusted under 35 U.S.C. 154(b) by 528 days.

(21) Appl. No.: 10/760,651

(22) Filed: Jan. 20, 2004

(65) Prior Publication Data

US 2005/0160232 A1    Jul. 21, 2005

(51) Int. Cl.
*G06F 12/00* (2006.01)
(52) U.S. Cl. .................................. 711/141; 711/146
(58) Field of Classification Search ......... 710/309–315, 710/105–107, 110–112, 240–244; 711/136–146, 711/150–151; 712/10–11, 28–31
See application file for complete search history.

(56) References Cited

U.S. PATENT DOCUMENTS

| | | | |
|---|---|---|---|
| 5,301,298 A * | 4/1994 | Kagan et al. ................. 711/141 |
| 5,706,463 A * | 1/1998 | Ebrahim et al. ............. 711/120 |
| 5,802,577 A | 9/1998 | Bhat et al. |
| 5,829,040 A | 10/1998 | Son |
| 5,875,467 A | 2/1999 | Merchant |
| 5,875,472 A | 2/1999 | Bauman et al. |
| 5,893,922 A * | 4/1999 | Baylor et al. ............... 711/148 |
| 5,958,019 A | 9/1999 | Hagersten et al. |
| 5,987,571 A * | 11/1999 | Shibata et al. .............. 711/141 |
| 6,049,851 A * | 4/2000 | Bryg et al. .................. 711/141 |
| 6,055,605 A | 4/2000 | Sharma et al. |
| 6,085,263 A | 7/2000 | Sharma et al. |
| 6,108,737 A | 8/2000 | Sharma et al. |
| 6,128,677 A * | 10/2000 | Miller et al. .................. 710/40 |
| 6,138,218 A * | 10/2000 | Arimilli et al. ............. 711/146 |
| 6,345,342 B1 | 2/2002 | Arimilli et al. |
| 6,351,784 B1 * | 2/2002 | Neal et al. .................. 710/308 |
| 6,457,100 B1 | 9/2002 | Ignatowski et al. |
| 6,467,012 B1 * | 10/2002 | Alvarez et al. ............. 710/316 |
| 6,490,661 B1 | 12/2002 | Keller et al. |
| 6,529,990 B1 * | 3/2003 | Kruse et al. ................. 710/310 |
| 6,615,319 B2 * | 9/2003 | Khare et al. ................ 711/141 |
| 6,631,401 B1 | 10/2003 | Keller et al. |
| 6,631,448 B2 * | 10/2003 | Weber ........................ 711/141 |
| 6,633,960 B1 * | 10/2003 | Kessler et al. .............. 711/144 |
| 6,654,858 B1 * | 11/2003 | Asher et al. ................. 711/144 |

(Continued)

OTHER PUBLICATIONS

Rajeev, Joshi, et al., "Checking Cache-Coherence Protocols with TLA+", Kluwer Academic Publishers, 2003, pp. 1-8.

(Continued)

*Primary Examiner*—Raymond N Phan

(57) ABSTRACT

Systems and methods are disclosed for interaction between different cache coherency protocols. One system may comprise a home node that receives a request for data from a first node in a first cache coherency protocol. A second node provides a conflict response to a request for the data from the home node. The conflict response indicates that an ordering point for the data is migrating according to a second cache coherency protocol, which is different from the first cache coherency protocol.

35 Claims, 5 Drawing Sheets

U.S. PATENT DOCUMENTS

| | | | |
|---|---|---|---|
| 6,711,653 B1 * | 3/2004 | Quach et al. | 711/146 |
| 6,751,721 B1 * | 6/2004 | Webb et al. | 712/10 |
| 6,877,056 B2 * | 4/2005 | Cypher | 710/244 |
| 6,883,070 B2 * | 4/2005 | Martin et al. | 711/141 |
| 6,922,756 B2 * | 7/2005 | Hum et al. | 711/145 |
| 7,171,521 B2 * | 1/2007 | Rowlands et al. | 711/141 |
| 7,222,220 B2 * | 5/2007 | Cypher et al. | 711/141 |
| 2001/0034815 A1 | 10/2001 | Dungan et al. | |
| 2002/0009095 A1 | 1/2002 | Van Doren et al. | |
| 2002/0073071 A1 | 6/2002 | Pong et al. | |
| 2002/0129211 A1 * | 9/2002 | Arimilli et al. | 711/146 |
| 2003/0018739 A1 | 1/2003 | Cypher et al. | |
| 2003/0140200 A1 | 7/2003 | Jamil et al. | |
| 2003/0145136 A1 | 7/2003 | Tierney et al. | |
| 2003/0195939 A1 | 10/2003 | Edirisooriya et al. | |
| 2003/0200397 A1 | 10/2003 | McAllister et al. | |

OTHER PUBLICATIONS

Martin, Milo M.K., et al., "Token Coherence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, date unknown.

Gharachorloo, Kourosh, et al., "Memory Consistency and Event Ordering In Scalable Shared-Memory Multiprocessors", Computer Systems Laboratory, pp. 1-14, date unknown.

Milo M. Martin, et al., "Bandwidth Adaptive Snooping", 8th Annual International Symposium on High-Performance Computer Architecture (HPCA-8), University of Wisconsin-Madison, http://www/cs/wisc.edu/multifacet, Feb. 6, 2002, pp. 1-12.

* cited by examiner

SYSTEM AND METHOD FOR CONFLICT RESPONSES IN A CACHE COHERENCY PROTOCOL WITH ORDERING POINT MIGRATION

RELATED APPLICATIONS

This application is related to the following commonly assigned co-pending patent applications entitled:
"CACHE COHERENCY PROTOCOL WITH ORDERING POINTS," application Ser. No. 10/760,640; "SYSTEM AND METHOD FOR RESOLVING TRANSACTIONS IN A CACHE COHERENCY PROTOCOL,"application Ser. No. 10/760,813; "SYSTEM AND METHOD TO FACILITATE ORDERING POINT MIGRATION," application Ser. No. 10/761,048; "SYSTEM AND METHOD TO FACILITATE ORDERING POINT MIGRATION FOR MEMORY," application Ser. No. 10/760,599 "SYSTEM AND METHOD FOR CREATING ORDERING POINTS," application Ser. No. 10/760,652; "SYSTEM AND METHOD FOR READ MIGRATORY OPTIMIZATION IN A CACHE COHERENCY PROTOCOL," application Ser. No. 10/761,044; "SYSTEM AND METHOD FOR BLOCKING DATA RESPONSES," application Ser. No. 10/761,034; "SYSTEM AND METHOD FOR NON-MIGRATORY REQUESTS IN A CACHE COHERENCY PROTOCOL," application Ser. No. 10/760,659; "SYSTEM AND METHOD FOR CONFLICT RESPONSES IN A CACHE COHERENCY PROTOCOL WITH ORDERING POINT MIGRATION," application Ser. No. 10/761,073; "SYSTEM AND METHOD FOR CONFLICT RESPONSES IN A CACHE COHERENCY PROTOCOL," application Ser. No. 10/761,047; "SYSTEM AND METHOD FOR RESPONSES BETWEEN DIFFERENT CACHE COHERENCY PROTOCOLS," application Ser. No. 10/760,436, all of which are filed contemporaneously herewith on Jan. 20, 2004, and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches can snoop broadcast requests to the system. The other caches respond by indicating whether a copy of requested the data is stored in the respective caches. Thus, correct ownership and usage of the data are determined by the collective responses to the broadcast requests.

An ambiguity can exist for a particular data block, such as when more than one processor seeks to access the same data concurrently. A mechanism for detecting whether such an ambiguity exists is known as a conflict. To maintain forward progress in a multi-processor system, the protocol implemented employs a conflict resolution scheme.

SUMMARY

One embodiment of the present invention may comprise a system that includes a home node that receives a request for data from a first node in a first cache coherency protocol. A second node provides a conflict response to a request for the data from the home node. The conflict response indicates that an ordering point for the data is migrating according to a second cache coherency protocol, which is different from the first cache coherency protocol.

Another embodiment of the present invention may comprise a multi-processor computer system. The system comprises memory that includes a home node for a line of data. The home node provides at least one snoop to obtain a copy of the line of data in response to a request provided by a first processor in a forward progress protocol. The home node reissues the at least one snoop when another copy of the line of data exists in the system associated with a broadcast-based protocol and no copy of the line of data is returned to the home node. The another copy of the line of data is at least as up-to-date as the line of data in the memory.

Another embodiment of the present invention may comprise a multi-processor computer system that includes a first processor that provides a first request to a home node for data employing a forward progress cache coherency protocol. The home node provides a snoop request for the data to at least a second processor and to an owner processor based on the first request. The second processor provides a miss response to the snoop request, and thereafter provides a source broadcast request for the data employing a broadcast-based cache coherency protocol. The owner processor comprises an associated cache that includes the data in a cache line having a first state that defines the owner processor as an ordering point for the data. The owner processor receives the source broadcast request prior to the snoop request from the home node. The owner processor provides an ownership data response to the source broadcast request and transitions from the first state to a transition state associated with the data. The owner processor provides a conflict response to the home node in response to receiving the snoop request while having the transition state associated with the data. The home node reissues the snoop request for the data in response to the conflict response from the owner processor.

Still another embodiment of the present invention may comprise a method that includes providing a snoop request for data from a home node in response to a request for the data according to a forward progress protocol. The snoop request is reissued from the home node in response to receiving a response at the home node associated with migration of an ordering point from cache of a first processor.

DETAILED DESCRIPTION

This disclosure relates generally to facilitating concurrent interaction between different cache coherency protocols. The approach described herein can enable combining a forward progress cache coherency protocol, such as a null-directory or directory-based protocol, with a broadcast-based coherency protocol. By way of example, the approach helps maintain coherency of data responses provided in the forward progress protocol during migration of a cache ordering (or serialization) point for the same line of data in the broadcast-based protocol.

Figure 1:
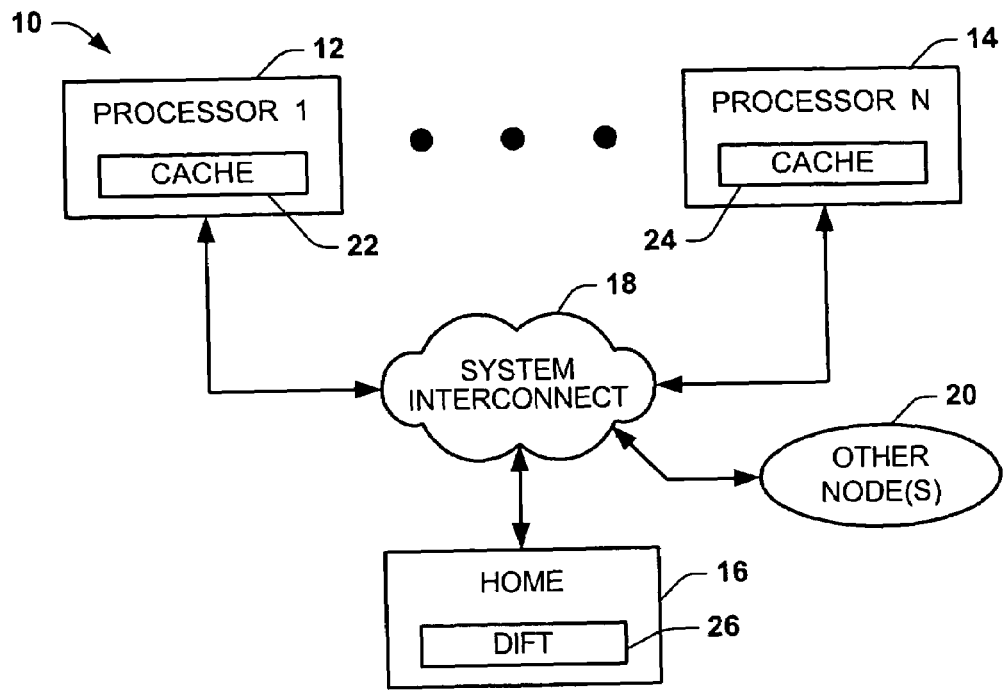
FIG. 1 depicts an example of a multi-processor system.

FIG. 1 depicts an example of a system 10 that implements a hybrid cache coherency protocol. The system 10 can implement the hybrid cache coherency protocol to include a primary broadcast-based protocol and a secondary forward progress protocol. A broadcast-based protocol, such as a broadcast source snoopy protocol, provides that the source node broadcasts snoops or requests directly to all other nodes in the system 10. In the forward progress protocol, a source node issues a request to a home node that responds by issuing one or more snoops (or probes) to other nodes in the system 10. Additionally, the forward progress protocol can be employed to reissue and process requests in conflict situations or when requests otherwise fail under the broadcast-based protocol.

As used herein, a forward progress protocol can be any type of protocol designed to ensure forward progress for processing requests to completion without deadlocking. Common examples of a forward progress protocol include a null-directory cache coherency protocol and a directory-based coherency protocol. Those skilled in the art will appreciate various null-directory and directory-based cache coherency protocols could be utilized as the secondary protocol by the system 10.

The hybrid protocol implemented by the system facilitates interaction between the broadcast-based protocol and the forward progress protocol, including during a cache-to-cache migration of an ordering point for data. As used herein, an ordering point defines a serialization of requests to the same memory line (or memory block) that is understood and followed by the system 10 (e.g., an ordering point can respond to requests).

The system 10 includes a plurality of processors 12 and 14 (indicated at PROCESSOR 1 through PROCESSOR N, where N is a positive integer (N>1)). The system 10 also includes a home node 16 that can be implemented in memory. The memory provides a single shared address space for the system. The memory can include one or more memory storage devices (e.g., dynamic random access memory (DRAM)). The memory, for example, can be a globally accessible aggregate memory, such as can be implemented as one or more memory nodes.

The processors 12 and 14 and a home node 16 define nodes in the system 10 that can communicate with each other via a system interconnect 18. For example, the system interconnect 18 can be implemented as a switch fabric or a hierarchical switch. Also associated with the system 10 can be one or more other nodes, indicated schematically at 20. The other nodes 20 can correspond to one or more additional processors or other multi processor systems (e.g., one or more symmetric multi-processor (SMP) nodes) connected to the system interconnect 18, such as through an appropriate interconnect interface (not shown).

Each of the processors 12, 14 includes at least one corresponding cache 22 and 24. For purposes of brevity, each of the respective caches 22 and 24 is depicted as a unitary memory structure, although each cache may include a plurality of memory devices or different cache levels. Each of the caches 22 and 24 includes a plurality of cache lines. Each cache line has an associated tag address that identifies corresponding data stored in the line. The system 10 employs the caches 22 and 24 and the home node 16 to store blocks of data, referred to as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache.

Each cache line can also include information identifying the state of the data stored in the respective cache. A given memory block can be stored in a cache line of one or more of the caches 22 and 24 as well as in a memory line of the home node 16, depending on the state of the line. Whether a cache line contains a coherent copy of the data also depends on the state of the cache line. Certain states employed by the coherency protocol can define a given cache line as an ordering point for the system 10 for use in the broadcast-based protocol implemented by the system. In the forward progress protocol, the home node (e.g., memory) 16 operates as the ordering point.

As mentioned above, the system 10 implements a hybrid cache coherency protocol to manage the sharing of memory blocks so as to ensure coherence of data. The coherency protocol establishes rules for transitioning between states, such as if data is read from or written to the home node 16 or one of the caches 22 and 24. In the hybrid system, for example, a given request is initially issued using the broadcast-based protocol. In the event that the request fails as well as in certain types of conflict situations, the request can be reissued using the forward progress protocol. Since it is possible that both protocols can run in the system 10 concurrently, the hybrid protocol supports interaction between the two protocols to help ensure that the home node 16 does not provide stale data.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block. The home node can be implemented in the home node 16. The types of information maintained at the home node generally depend on the particular protocols supported by the system 10.

For example, in a null-directory-based protocol the home node corresponds to a shared memory structure that receives a request from a source node. The home node 16 creates an entry in a directory in flight table (DIFT) 26 then snoops the system 10 for a coherent copy of the requested data. The DIFT 26 manages responses to the system snoops issued by the home node 16. In a standard directory-based protocol, the home node 16 includes a directory (not shown) that includes information identifying where in the system 10 a coherent copy of the data should be located for each memory block. While a single home node 16 is depicted in FIG. 1, any number of one or more nodes and memory structures could be utilized.

The protocol implemented by the system 10 for processing a given request sets the available states and possible state transitions at each respective node 12, 14, 16, 20. Additionally, the type of response and whether a response will be provided depends upon the type of request, as well as the state of the identified memory block contained in the responding nodes. A set of cache states that can be implemented by the system 10 for a respective cache line is depicted below in Table 1. Since there are eight possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up-to-date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cached copy in the system, and the caching processor must respond to snoops by returning data and must write data back to memory upon displacement. |
| O | Owned - The cache line is valid and more up-to-date than memory. The caching processor may have modified the cache line. Other processors may have valid copies, and the caching processor must respond to snoops by returning data and must write data back to memory upon displacement. |
| T | Transition - The cache line is in transition. The cache line may be transitioning from O, M, E, F or D to I, or the line may be transitioning from I to any one of the valid states. |

As mentioned above, the state of a cache line can be utilized to define a cache ordering point in the system 10. In particular, for a broadcast-based protocol implementing the states set forth in Table 1, a cache line having one of the states M, O, E, F or D can serve as a cache ordering point for the data contained in that cache line. The broadcast-based coherency protocol implemented by the system 10 enables the ordering point for a given cache line to be transferred from an owner node (the node serving as the current ordering point) to the cache of a destination node to serve as a new ordering point.

The cache line of the owner node transitions to the T-state to help ensure data coherency during ordering point migration to the destination node. The destination node can provide a message to acknowledge when the ordering point has successfully migrated. The T-state can be maintained at the owner node until the owner receives confirmation that the ordering point has successfully migrated to the destination node. While in the T-state for cached data, the owner node provides a T-conflict response to requests for the data. The cache line of the owner node further can transition from the T-state to the I-state in response to receiving the acknowledgment message from the destination node. The owner node can respond to the acknowledgement message by providing a further acknowledgement message back to the destination node. The request that initiated the migration sequence can be considered complete in response to receiving the acknowledgment provided by the owner node.

By way of example, assume that the processor 12 (a source node) requires a copy of data associated with a particular tag address, and assume that the data is unavailable from the processor's own local cache 22. Since the processor 12 does not contain a copy of the requested data, the processor may be initially in the I-state (invalid) for that data or the processor may contain a different line altogether. For purposes of simplicity of explanation, the starting state for this and other examples is referred to as the I-state. The processor 12, operating as the source node, transmits a source broadcast request to the other processor 14, to the home node 16 and to the other nodes 20 via the system interconnect 18. Further, assume that the processor 12 has been caused to employ the forward progress protocol to request the data, such as in response to the source broadcast request failing or a conflict condition. The processor 12 retries the request for the desired data. The processor can retry the request in the forward progress protocol, such as by sending an appropriate request to the home node 16 according to the forward progress protocol. Other forward progress techniques could also be utilized, such as reissuing the request employing the broadcast-based protocol, for example. The home node 16 creates a DIFT entry 26 for the retry request and issues a snoop to the system 10 by sending corresponding snoop requests to the other nodes 14 and 20.

Assume that the processor 14 includes the requested data in the cache 24 in a state that defines the processor as a cache ordering point for the data. Assume further that another processor (e.g., the other nodes 24) has issued a source broadcast request (using the broadcast-based protocol) for the same data as the snoop issued from home node 16, and that the processor 14 has provided an ownership data response to the requester prior to receiving the snoop. The processor 14 transitions to the T-state in conjunction with providing the ownership data response in the broadcast-based protocol. The processor 14 provides a T-conflict response to the snoop issued by the home node 16. The T-conflict response from the processor 14 indicates that the ordering point is being transferred from the processor 14 to another node in the system 10. Since the ordering point migration involves transferring a copy of data that might be more up-to-date than at the home node 16, a memory data response from the home node could contain unreliable (or stale) data.

In response to receiving the T-conflict response, the home node 16 sets a conflict condition and reissues the snoops to the system 10. Additionally or alternatively, the home node 16 can set such a conflict condition and reissue the snoops in other situations. For example, the home node 16 can set a conflict condition and reissue the snoops in any situation when no copy of the requested data is returned to the home node 16 in response to the snoops while another copy of the line of data, which may be more current than the memory (e.g., a cached copy), exists in the system 10. The cached copy, for example, can have a state allowing the data to be at least as up-to-date as the corresponding line of data in the home node (memory) 16. The home node 16 can ascertain whether such a cached copy exists based on the responses received to the probes (e.g., including the T-conflict response) and/or based on state information that can be maintained at the home node (e.g., in a null-directory protocol).

After the home node 16 reissues the snoops, the forward progress protocol ensures that desired data will be provided to the source processor 12 employing the forward progress protocol. For instance, the processor that is operating as the new cache ordering point for the data can provide a data response to the source processor 12 as well as to the home node 16. Alternatively, the snoops reissued can find an outstanding request in a miss address file (MAF), resulting in MAF conflict in which the snoop request is queued and eventually completed.

From the foregoing example, those skilled in the art will understand and appreciate that in most situations, a request from a source node can be completed in the system 10 using the broadcast-based protocol in the time associated with performing two hops (e.g., via two virtual channels: a request channel and a response channel). In other situations, the forward progress protocol can be utilized to transfer data from one cache to another cache, typically in the time associated with performing about three to four hops (e.g., via three virtual channels: a request channel, a snoop channel and a response channel). As a result, interaction between the forward progress and broadcast-based protocols is facilitated, including during ordering point migration associated with the broadcast-based protocol.

Figure 2:
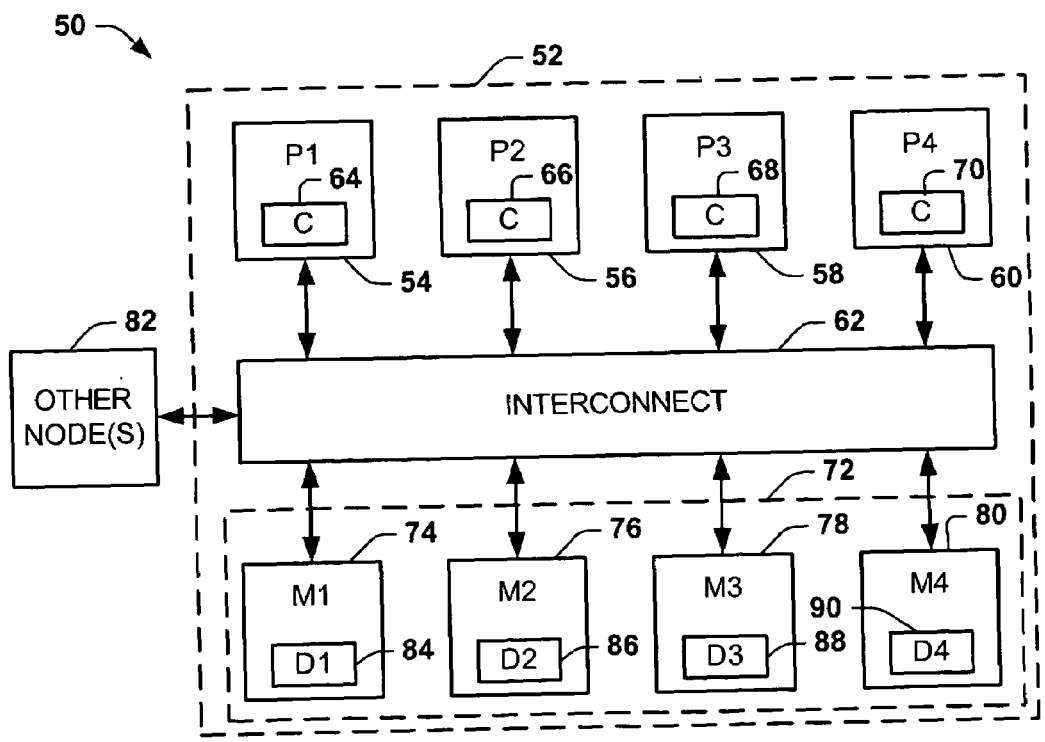
FIG. 2 depicts an example of another multi-processor system.

FIG. 2 depicts an example of a multi-processor computing system 50. The system 50, for example, includes an SMP node 52 that includes processors (P1, P2, P3, P4) 54, 56, 58 and 60 in communication with each other via a local interconnect 62. The interconnect 62 facilitates transferring data between processors and memory of the system 50. While four processors 54, 56, 58 and 60 are depicted in the example of FIG. 2, those skilled in the art will appreciate that a greater or smaller number of processors can be implemented in the node 52.

Each processor 54, 56, 58 and 60 also includes an associated cache 64, 66, 68 and 70. The caches 64, 66, 68 and 70 can enable faster access to data than from an associated main memory 72 of the node 52. The system 50 implements a cache coherency protocol designed to ensure coherency of data in the system. By way of example, the cache coherency protocol can be implemented as a hybrid protocol that includes a source broadcast protocol in conjunction with another forward progress protocol, such as a null-directory or directory-based protocol. The system 50 of FIG. 2, for example, employs the source broadcast protocol to broadcast requests for desired data from a source node. If the source broadcast request fails, such as when a conflict exists, the source node can transfer to the forward progress protocol and reissues a corresponding request to the home node using such protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can operate as a home node for predetermined lines of data stored in the memory 72. Each memory module 74, 76, 78, 80 thus can employ a DIFT (D1, D2, D3, D4) 84, 86, 88, 90 to manage requests for corresponding data issued to the respective home node memory modules in the forward progress protocol. Additionally, each of the memory modules 74, 76, 78 and 80 can include a directory (not shown), such as for use in a directory-based protocol. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58 and 60 and the memory 70, as well as those to and from the other nodes 82.

Assume that the processor 56 requires desired data not available from the local cache 64, and that circumstances (e.g., a conflict or a prior source broadcast request for the data failed) in the system 50 have caused the processor 56 to employ the forward progress protocol. Thus, the processor 56 issues a request (e.g., via a virtual request channel) to a home node (e.g., in the memory module 74) associated with the desired data. The home memory module 74 issues a snoop request (e.g., via a virtual snoop channel) to other nodes in the system according to the forward progress being implemented. For example, in a null-directory protocol the home memory module 74 can snoop the processors 54, 58 and 60 as well as the other nodes 82 via the interconnect 62.

Assume, for example, that the processor 60 was an owner of the desired data at some point in time prior to receiving the snoop from the home memory module 74. For instance, the processor 60 contains the data in the cache 70 in a state (e.g., M, O, E, F or D) associated with the cached data that defines that processor as a cache ordering point for such data. Assume further that the processor 60 receives a source broadcast request from another processor (e.g., the processor 58) for the same line of data requested by the source processor 56, which source broadcast request arrives just prior to the snoop. In this situation, the processor 60 can provide an ownership data response to the processor 58 and, in conjunction with providing the ownership data response, the processor 60 can transition to the T-state. The processor 60 may remain in the T-state until the processor confirms that the ordering point has successfully migrated.

If the processor 60 receives the snoop from the home memory module 74 while in the T-state, the processor responds to the home with a T-conflict response (e.g., via a virtual response channel). The T-conflict response from the processor 60 indicates that the ordering point is migrating from the processor 60 (e.g., to the processor 58). In response to receiving the T-conflict response, the home memory module 74 sets a conflict condition and reissues the probes to the system 50 via the interconnect 62. The home memory module 74 can also set a conflict condition and reissue the snoop in other situations. For example, the home can reissue the snoop when no copy of the requested data is returned to the home memory module 74 in response to the probes while another potentially more up-to-date copy of the line of data (e.g., a cached copy) exists in the system 50. The home memory module 74 can ascertain whether such a cached copy exists based on the responses received to the probes (e.g., including the T-conflict response) and/or based on state information that can be maintained at the home node (e.g., in a directory-based protocol). After the home node 16 reissues the probes, the forward progress protocol ensures that the request issued by the source processor 56 will be completed.

In response to receiving the ownership data response, the processor 58 transitions to a state (e.g., O or D), which defines the processor as a new cache ordering point for the data. As a cache ordering point, the processor 58 can respond to requests for the data, including providing an ownership data response that transfers ordering point to another node. After receiving the cache ordering point, the processor 56 provides a migration acknowledgement (MACK) signal to the processor 60 to acknowledge the ordering point has successfully migrated. The processor 56 can provide the MACK signal, for example, after receiving responses from all other nodes (e.g., processors and memory) in the system 50. The MACK signal enables the processor 60 to transition from the T-state to the I-state. The processor 60 responds to the MACK signal by providing a corresponding MACK acknowledgement (MACK-ACK) response.

The other processors 54 and 56 as well as the memory also respond to the source broadcast request issued by the processor 58. Since the processor 56 has an outstanding request for the same line of data employing the forward progress protocol, the processor 56 provides a conflict response. This conflict response may cause the processor 58 to reissue the request in the forward progress protocol, depending on the type of request issued. Additionally, the conflict response causes the processor 58 to transition the state of the cached data acquired from the ownership data response to the O-state (in place of a transition to the D-state), which mitigates potential starvation of the processor 54. Starvation is mitigated since the O-state does not permit the processor 58 to modify the line of data, without first changing states and updating the home memory module 74. Those skilled in the art will appreciate various starvation avoidance mechanisms that could be utilized in the system 50.

In view of the above, the system 50 thus employs a hybrid cache coherency protocol that facilitates interaction between different protocols, such as a forward-progress protocol and a source-broadcast protocol. The hybrid protocol utilizes a T-conflict response helps to ensure that a requester (e.g., the processor 56) employing the forward progress protocol does not acquire stale data from the memory 72, including during migration of cache ordering point.

Figure 3:
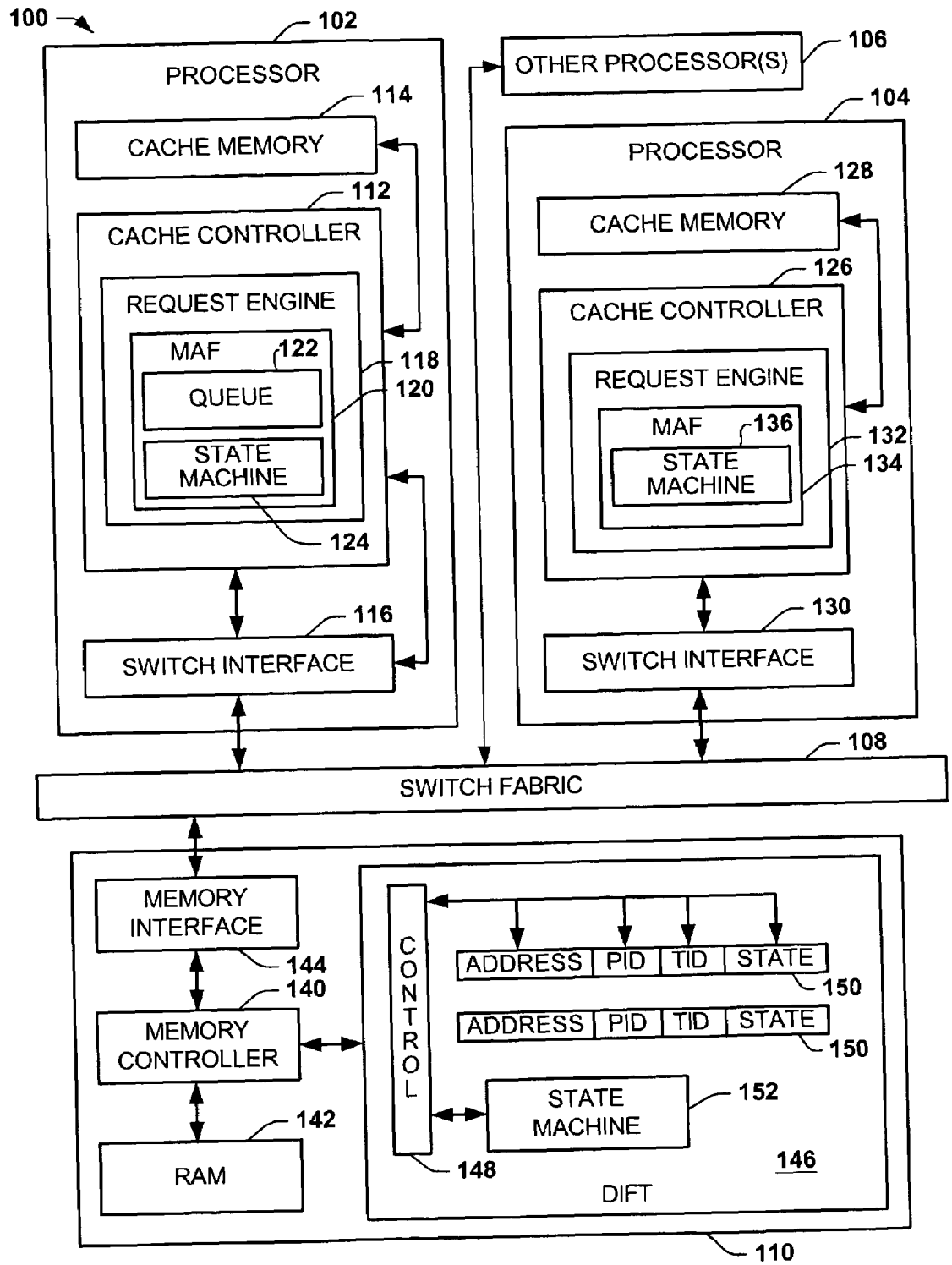
FIG. 3 depicts an example of a multi-processor system implementing a hybrid protocol.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104 and 106 as well as other nodes (not shown). For example, the memory 110 can be implemented as a plurality of separate memory modules, with a variety of module configurations for storing selected data. The system 100, for example, can be implemented as an integrated circuit or as circuitry (e.g., one or more circuit boards) containing plural integrated circuits.

The system 100 employs two different cache coherency protocols, including a primary broadcast-based protocol and a secondary forward progress protocol. The broadcast-based protocol can be a source broadcast cache coherency, in which a source processor 102, 104, 106 can issue a source broadcast request to the system 100, including all other processors in the system and the memory 110. The other processors in the system 100 and the memory 110 respond to the source broadcast request, which results in a cached copy and/or a memory copy of the data being returned to the source processor. In the event that a conflict arises or the source broadcast request otherwise fails, the source processor reissues the request using the forward-progress protocol.

The forward progress protocol can be a null-directory or a directory-based protocol. For example, the memory 110 includes a home node for each line of data that serves as an ordering point for the data. A source node issues a request to the home node for such data. The home node operates as static ordering point for requested data since all requests are sent to the home node for ordering before snoops are broadcast. The forward progress protocol tends to add an additional hop (e.g., increased latency) for the majority of references compared with the broadcast-based protocol, as described above. If the system 100 employs a standard directory-based protocol, ordering is implemented at the home node, but the memory 110 employs an associated directory at the home node to facilitate locating the data (e.g., based on the directory state associated with the requested data). In a standard directory protocol, there will also be circumstances when the directory indicates that there are no cached copies, and thus the home node can respond with the data without issuing any snoops to the system 100. For purposes of brevity, the following description of FIG. 3 assumes the forward progress protocol is implemented as a null-directory protocol.

The processor 102 includes a cache controller 112 associated with cache memory 114. The cache memory 114 contains a plurality of cache lines that includes one or more memory blocks. A tag address and state information are associated with each cache line to facilitate access to the cache lines by the cache controller 112. Examples of states that can be associated with each cache line in the cache memory 114 are identified above in Table 1.

The cache controller 112 controls and manages access to the cache memory 114, including requests for data and responses to requests from other nodes. The cache controller 112 communicates requests and responses to the system 100 via a switch interface 116 that is coupled with the switch fabric 108. The switch interface 116, for example, includes an arrangement of queues (e.g., input and output queues) or other data structures that organize both requests and responses issued by the processor 102 as well as requests and responses for execution by the processor 102.

The cache controller 112 employs a request engine 118 to manage requests issued by the processor 102. The request engine 118 includes a miss address file (MAF) 120 that contains MAF entries for outstanding requests associated with a subset of the locations in the cache memory 114. The MAF 120 manages requests issued by the processor 102 as well as responses to such requests. The MAF 120 can be implemented as a table, an array, a linked list or other data structure programmed to manage and track requests for each cache line. A given MAF entry can operate in a mode associated with each protocol (e.g. a broadcast mode or a forward progress mode) or, alternatively, different MAFs can be utilized for each of the two protocols implemented in the system 100. For example, the request engine 118 allocates an entry in a given MAF according to the protocol in which the associated request was issued (e.g., according to the forward progress protocol or the broadcast-based protocol). The MAF 120 is programmed to execute program instructions based on a predefined set of rules for the respective protocol.

By way of example of FIG. 3, assume that the processor 102 allocates a MAF entry in the MAF 120 to acquire a line of data employing the forward progress protocol. As mentioned above, a request can be issued in the forward progress protocol when a prior source broadcast request for the data fails. The request engine 118 communicates the request to the memory 110 via the interface 116. The MAF entry includes a queue 122 and one or more state machines 124.

The queue 122 can be utilized for storing snoop requests issued by a home node in the memory 110 corresponding to a request from another processor in the system 100. The snoop stored in the queue 122 can operate to block subsequent requests for the data in the (e.g., stall their completion) home node as well as enable the cache controller 112 to respond to the stored request, such as by providing a corresponding data response, based on the state of the requested data in the cache memory 114.

The state machine 124 employs rules for processing responses received for the associated request. For example, the state machine 124 can determine whether to write data to the cache line (e.g., based on the command type of the data response). The state machine can also ascertain the existence of a conflict condition based on the responses received for the request associated with the MAF entry. The MAF entry can also include fields that identify the address of the data being requested, the type of request, and response information (e.g., including data) received from other nodes in response to the request.

The cache controller 112 also is programmed and/or configured to control the state of each cache line in the cache memory 114 and implements state transitions for the cache lines based on predefined rules established by the cache coherency protocol(s) implemented in the system 100. Examples of state transitions that can occur in the system 100 for selected processor commands are provided in Table 2. The commands beginning with the term "broadcast" generally correspond to broadcast snoop commands implemented within the context of the source broadcast protocol. Most of the other commands (not beginning with "broadcast") are examples of typical commands that can be implemented within the context of the forward progress protocol (e.g., null-directory protocol), also implemented by the system 100.

TABLE 2

| Command | Current State | | | Next State | | | |
|---|---|---|---|---|---|---|---|
|  | Source | Owner | Sharer | Source | Owner | Sharer | Memory |
| Broadcast non-migratory read request | I | I | I | E or F | I | I |  |
|  | I | I | S | F | I | S |  |
|  | I | E | I | S | F | I |  |
|  | I | F | I | S | F | I |  |
|  | I | F | S | S | F | S |  |
|  | I | D | I | S | O | I |  |
|  | I | M | I | S | O | I |  |
|  | I | O | I | S | O | I |  |
|  | I | O | S | S | O | S |  |
| Broadcast migratory read request | I | I | I | E | I | I |  |
|  | I | I | S | F | I | S |  |
|  | I | E | I | S | F | I |  |
|  | I | F | I | S | F | I |  |
|  | I | F | S | S | F | S |  |
|  | I | D | I | S | O | I |  |
|  | I | M | I | D | I | I |  |
|  | I | O | I | S | O | I |  |
|  | I | O | S | S | O | S |  |
| Broadcast incoherent read - read current data | I | I | I | I | I | I |  |
|  | I | I | S | I | I | S |  |
|  | I | E | I | I | E | I |  |
|  | I | F | I | I | F | I |  |
|  | I | F | S | I | F | S |  |
|  | I | D | I | I | D | I |  |
|  | I | M | I | I | M | I |  |
|  | I | O | I | I | O | I |  |
|  | I | O | S | I | O | S |  |
| Non-migratory read request | I | I | I | E or S | I | I |  |
|  | I | I | S | S | I | S |  |
|  | I | E | I | S | S | I |  |
|  | I | F | I | S | S | I |  |
|  | I | F | S | S | S | S |  |
|  | I | D | I | S | S | I | Update |
|  | I | M | I | S | S | I | Update |
|  | I | O | I | S | S | I | Update |
|  | I | O | S | S | S | S | Update |
| Migratory read request | I | I | I | E | S | I |  |
|  | I | I | S | S | S | S |  |
|  | I | E | I | S | S | I |  |
|  | I | F | I | S | S | I |  |
|  | I | F | S | S | S | S |  |
|  | I | D | I | S | S | I | Update |
|  | I | M | I | E | I | I | Update |
|  | I | O | I | S | S | I | Update |
|  | I | O | S | S | S | S | Update |
| Read-modify with no update to memory | I | I | I | E | I | I |  |
|  | I | I | S | E | I | I |  |
|  | I | E | I | E | I | I |  |
|  | I | F | I | E | I | I |  |
|  | I | F | S | E | I | I |  |
|  | I | D | I | D | I | I |  |
|  | I | M | I | D | I | I |  |
|  | I | O | I | D | I | I |  |
|  | I | O | S | D | I | I |  |
| Broadcast invalidate line | F | — | I | E | I | I |  |
|  | F | — | S | E | I | I |  |
|  | O | — | I | D | I | I |  |
|  | O | — | S | D | I | I |  |

TABLE 2-continued

| Command | Current State | | | Next State | | | Memory |
|---|---|---|---|---|---|---|---|
| | Source | Owner | Sharer | Source | Owner | Sharer | |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Invalidate line | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Invalidate line - no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read-modify with update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Cache flush - FPP only | * | * | * | I | I | I | Update |
| Broadcast memory write back | D/M/O | — | I | I | I | I | Update |
| | D/M/O | — | S | I | I | S | Update |
| Port memory write back | D/M/O | — | I | I | I | I | Update |

The cache controller 112 also controls responses provided by the processor 102. The processor 102 provides responses to requests or snoops received via the switch interface 120 from another processor 104, 106 or the memory 110. The cache controller 112 employs the MAF 120, including the queue 122 and the state machine 124, to provide a corresponding response based on the type of request, the protocol in which the request was issued, and the state of data contained in the cache memory 114. For example, the cache controller 112 can provide a conflict response if a forward progress protocol MAF entry already exists for data being requested using the broadcast-based protocol. Alternatively, the cache controller can place a request that was issued using the forward progress protocol in the queue 122 for subsequent processing by the processor 102. The cache controller 112 can also effect a state transition for an associated cache line in response to a request or other command (See, e.g., Table 2).

In FIG. 3, the processor 104 is similar to the processor 102. Briefly stated, the processor 104 includes a cache controller 126 associated with a cache memory 128 that contains a plurality of cache lines. The cache controller 126 controls and manages access to the cache memory 128, including requests for data and responses to requests from other nodes in the system 100. The cache controller 126 communicates requests and responses to the system 100 via a switch interface 130 that is coupled with the switch fabric 108 for organizing requests and responses issued by the processor 104 as well as requests and responses provided to the processor for execution.

The cache controller 126 also employs a request engine 132 to manage requests issued by the processor 104. The request engine 132 includes a MAF 134 that contains MAF entries for outstanding requests associated with a subset of the locations in the cache memory 128. The MAF 134 manages requests issued by the processor 104 as well as responses to such requests. The request engine 132 can contain one or more MAFs, such as one for each of the protocols implemented in the system 100. Thus, A MAF entry can be allocated for requests issued by the processor 104 for processing the request and responses to the request according to the rules established by the coherency protocol associated with the request.

By way of further example, assume that the processor 104 is implementing the broadcast-based protocol for a request to the same line of data as the processor 102 is implementing the forward progress protocol. Thus, a MAF entry is created in the MAF 134 for the request associated with a source broadcast request (or any transaction) associated with the data. The MAF entry includes a state machine 136 that determines what actions are to occur based on the request issued, the responses received for the request and transition requirements provided by the broadcast-based protocol.

The state machine 136 can include multiple components for processing responses to the associated request, such as a data state machine and a conflict state machine. For example, the state machine 136 can maintain a state for data received at the MAF based on responses to the request. The request engine 132 employs the data state machine and the conflict state machine to determine what actions to take after a complete set of responses has been received by the processor 104. The actions can include, for example, a cache fill, a state transition as well as transitioning to the forward progress protocol, such as in conflict situations. The other processors can be configured to operate similarly to the processors 102 and 104 described above.

The memory 110 includes a memory controller 140 programmed and/or configured to service transactions by accessing one or more associated memory storage devices (e.g., random access memory (RAM)) 142. The memory controller 140 communicates requests and responses with other nodes in the system 100 via an interface 144 coupled to the switch fabric 108. The memory controller 140 operates to process a given transaction according to the type of protocol associated with the transaction. For example, in response to a source broadcast request in the broadcast-based protocol, the memory controller 140 accesses the memory device 142 for a corresponding home node and provides an appropriate response to the requester through the interface 144.

The memory controller 140 can also operate in the forward progress protocol (e.g., a null-directory or directory-based protocol) by employing a DIEFT entry 146 to manage a request to a corresponding home node for a given line of data. For example, a DIFT entry 150 is allocated in the DIFT 146 for each request issued to the home node for a given line of data and issues one or more snoops the system 100. Each DIFT entry 150 can include fields identifying, for example, a tag address for a line of data, a processor identifier (PID) that identifies a requesting or source processor, a transaction (or MAF) identifier (TID) that uniquely identifies a given transaction (and transaction type) and state information (STATE) associated with the request. The DIFT 146 also includes control (e.g., logic) 148 that manages the requests and responses for each entry 150 of the DIFT.

In FIG. 3, the control 148 also employs a state machine 152 to track responses to snoops by the memory controller for each DIFT entry 150 in the forward progress protocol. Each DIFT entry 150 employs the state machine 152 to control the state information associated with each DIFT entry 150. After a complete set of snoop responses has been received for a DIFT entry 150, the control 148 can employ the DIEFT transaction type and the state of the DIFT entry (determined by the state machine 152) to implement appropriate action.

One action that can be implemented by the control 148 in the forward progress protocol is to set a conflict condition based on responses received for a given DIFT entry 150. In particular, the state machine 152 can include a transition state that enables the DIFT 146 to manage a cached ordering point that is migrating from one cache to another cache in the system 100, such as can occur using the broadcast-based protocol. The state machine 152 can transition the state of a DIFT entry to the transition state in response to receiving the T-conflict response from a processor having the T-state for the requested line of data.

The transition state for the state machine 152 operates to prevent the control 148 from returning potentially erroneous memory data to the memory controller 140 in response to a request issued in the forward progress protocol when all other responses are MISS responses. All MISS responses can be provided, for example, when the most up-to-date copy of a line of data item is cached, but where no owner was identified by the responses to the snoop issued by the home node in the forward progress protocol (e.g., associated with ordering point migration). Accordingly, when a T-conflict response is received for a given DIFT entry 150, the control 148 is programmed to provide instructions to the memory controller 140 to reissue the snoops to the system 100 via the interface 144 for a cached copy of the data identified by the tag address in the DIFT entry 150. The reissued snoops can result in a data response being returned from cache. Alternatively, if one of the snoops finds an outstanding MAF entry in the broadcast-based protocol, a forward progress protocol conflict can occur. When a forward progress protocol conflict occurs for a given transaction, the forward progress protocol employs appropriate starvation avoidance mechanisms to resolve the conflict and complete the request in the forward progress protocol. For example, a forward progress protocol conflict can cause all nodes in the system 100 to operate in the forward progress protocol for the given transaction.

Figure 4:
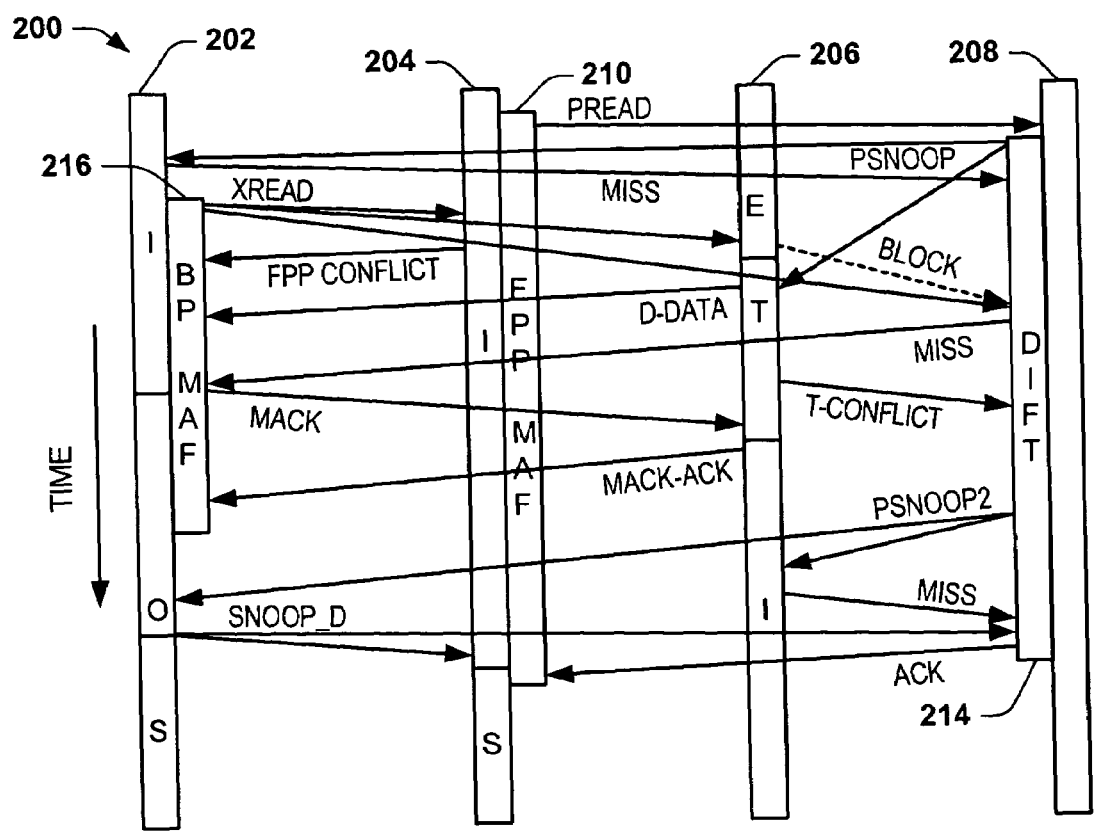
FIG. 4 depicts a first example of forward progress conflict resolution during ordering point migration.
Figure 5:
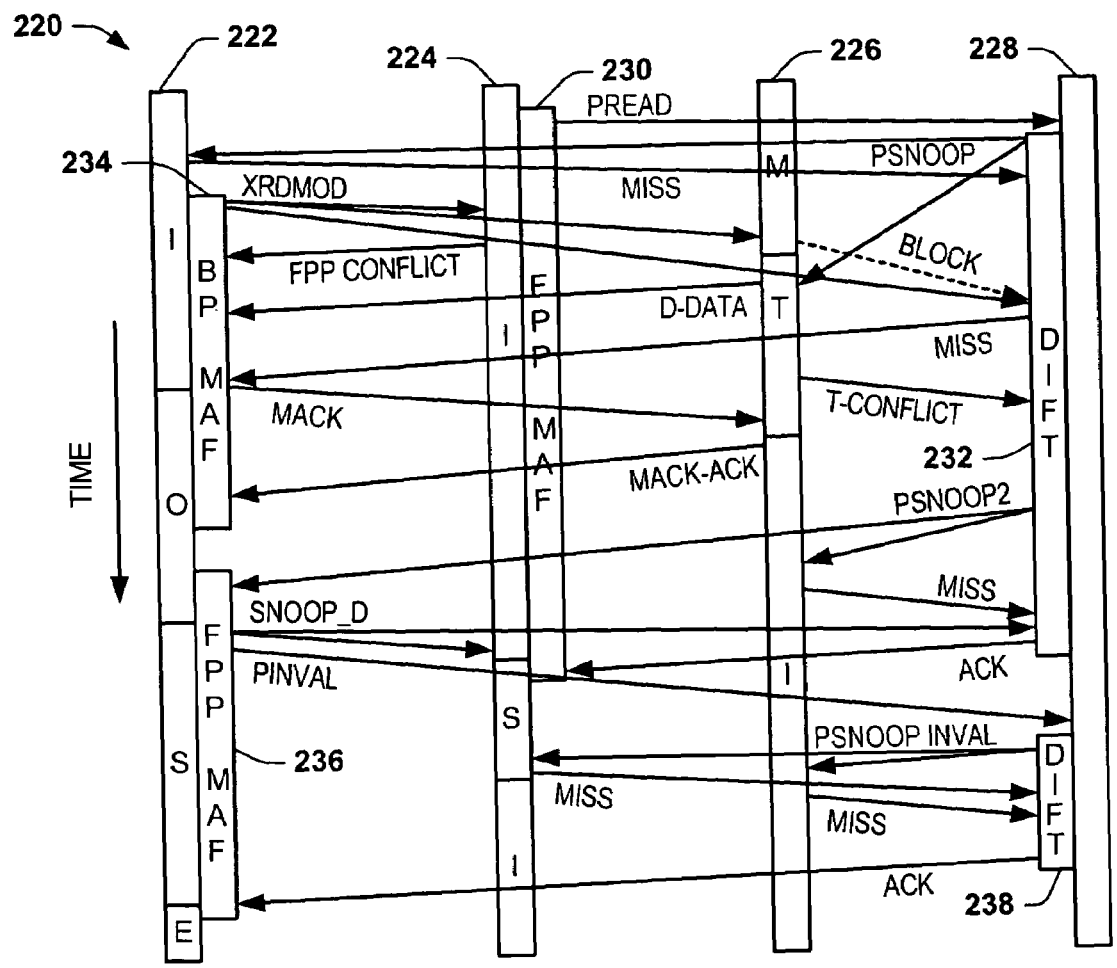
FIG. 5 depicts a second example of forward progress conflict resolution during ordering point migration.
Figure 6:
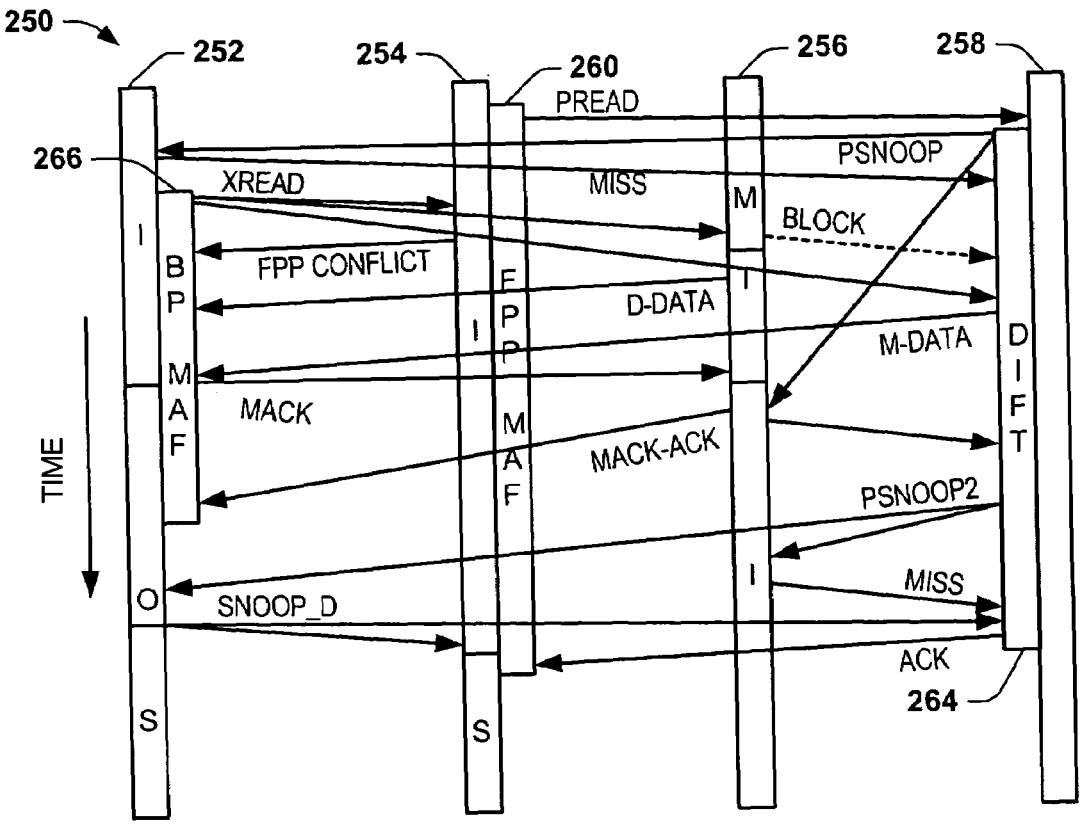
FIG. 6 depicts a flow diagram illustrating a method.

In view of the foregoing structural and functional features described above, certain methods that can be implemented using a hybrid cache coherency protocol will be better appreciated with reference FIGS. 4-6. The examples in FIGS. 4 and 5 illustrates various interrelationships between requests and responses and state transitions that can occur for a given memory address (e.g., memory line) in different processor caches or memory devices. In each of these examples, time flows in the direction of an arrow labeled "TIME." Those skilled in the art may appreciate various other cases that can be implemented using the coherency protocols described herein. For purposes of brevity, the examples FIGS. 4 and 5 are described with the forward progress protocol implemented as a null-directory protocol; although, other directory-based protocols could also be utilized. Additionally, the following methodologies can be implemented by hardware (e.g., as one or more integrated circuits or circuit boards containing a plurality of microprocessors), software (e.g., as executable instructions running on one or more processors or controllers), or any combination thereof.

FIG. 4 depicts a multi-processor network 200 that includes a plurality of processor nodes 202, 204 and 206 and a home node 208. Initially, the processor nodes 202 and 204 are in the I-state and the processor node 206 is in the E-state, which defines the node 206 as a cache ordering point for requests for the data in the broadcast-based protocol. As described herein, other states can also define the node 206 as a cache ordering point.

The node 204 allocates a forward progress protocol MAF entry 210 and issues a corresponding probe read (PREAD) request to the home node 208. The home node 208 allocates a DIFT entry 212 in response to the PREAD request from the source node 204. The example of FIG. 4 can also be implemented with other types of requests issued by the processor node 204 in the forward progress protocol (See, e.g., Table 2).

After allocating the DIFT entry 212, the home node 208 issues a corresponding snoop request (PSNOOP) to the nodes 202 and 206. The node 202 provides a MISS response to the home node since it is in the I-state when it receives the PSNOOP request. As shown in FIG. 4, the owner node 206, however, has transitioned from the E-state to the T-state prior to receiving the PSNOOP request from the home node. Accordingly, the node 206 provides a T-conflict response to the home node 208. The T-conflict response indicates that the ordering point is migrating from one cache to another and, thus, the data at the home node may not be coherent.

The transition at the owner node from the E-state to the T-state is a result of a source broadcast request (XREAD) from the node 202. After responding to the PSNOOP, the node 202 allocates a MAF entry (BPMAF) 214 to obtain a copy of the data employing the broadcast-based protocol. Thus, the node 202 broadcasts the XREAD request to the network 200, including the nodes 204, 206 and 208. Since the owner node 206 is a cache ordering point (E-state) for the requested data when it receives the XREAD request, the node 206 transitions from the E-state to the T-state and provides a corresponding ownership data response (D-data) to the node 202. An ownership data response is provided by a cached ordering point (e.g., having an E, F, D, M or O-state) in response to a source broadcast snoop command. Since an ordering point is migrating with the ownership data response (D-data), at most one D-data response can exist per cache line at any given time.

The owner node 206 can also provide a BLOCK message to the home node 208 (indicated as a dotted line) in conjunction with providing the ownership data response (D-DATA). The home node 208 employs the BLOCK message to provide a non-data MISS response provided that the BLOCK message can be matched with the XREAD transaction pending at the home node. If the BLOCK message does not match with the XREAD transaction, the memory can provide a memory copy of the requested data to the node 202. The node 204 provides a forward progress protocol conflict (FPP CONFLICT) response to the XREAD request since the FPP MAF 210 is outstanding when the XREAD request is received. In the example of FIG. 4, since the node 202 receives the FPP CONFLICT response to the XREAD request, the node 202 transitions from the I-state to the O-state after it receives a complete set of responses to the XREAD request. The transition to the O-state is in contrast to a situation when no FPP CONFLICT response is received, in which the node 202 can transition from the I-state to the D-state so that it can modify the received data. The transition to the O-state facilitates starvation avoidance since the node 202 cannot modify the line of data when in the O-state.

In parallel with the T-CONFLICT response, the node 202 also provides a migration acknowledgement (MACK) message to the owner node 206 acknowledging receipt of the ownership data response (D-DATA). The MACK message enables the owner node 206 to transition from the T-state to the I-state. The node 206 then provides an acknowledgement message to the MACK message, indicated at MACK-ACK.

After the node 202 receives the MACK-ACK response, the node 202 can retire the BP MAF 214, thereby enabling the node 202 to respond to subsequent requests for the data as the new cache ordering point.

During an ordering point migration, the data at the memory or home node 208 may not be as up-to-date as the D-data. Thus, the forward progress protocol requires that the home node 208 reissue the snoops (indicated at PSNOOP2) to the nodes 202 and 206 in response to the T-conflict response. The node 206, being in the I-state, provides a corresponding MISS response to the home node 208. The node 202, being in the O-state, provides a SNOOP_D response to the home node 208 as well as to the node 204. The SNOOP_D response includes an up-to-date copy of the requested data. In response to providing the copy of data, the node 202 also transitions from the O-state to the S-state pursuant to state transition requirements of the forward progress protocol. The home node 208 provides an acknowledgement message (ACK) to the node 204 in response to receiving the SNOOP_D response from the node 202 and retires the DIFT entry 212. After the node 204 receives the ACK message from the home node 208, the node 204 also retires the FPP MAF 210. In response to receiving the SNOOP_D response from the node 202, the node 204 also transitions from the I-state to the S-state. With the data response back to the home node 208, the ordering point for the data has effectively migrated from the cache of the node 202 to the home node 208.

FIG. 5 depicts a multi-processor network 220 that includes a plurality of processor nodes 222, 224 and 226 and a home node 228. The processor nodes 222 and 224 are initially in the I-state and the processor 226 is in the M-state, which defines the processor node 226 as a cache ordering point for the line of data represented in the network 220. The processor node 224 allocates a FPP MAF entry 230 and issues a probe read (PREAD) request to the home node 228. The home node 228 allocates a DIFT entry 232 associated with the request from the source node 224 in the forward progress protocol. The home node 228 issues a corresponding home snoop (PSNOOP) to the nodes 222 and 226.

The node 222 provides a MISS response to the home node since it is in the I-state when it receives the PSNOOP. The owner node 206 has transitioned from the M-state to the T-state prior to receiving the PSNOOP from the home node 228. The owner node 226 transitions from the M-state to the T-state in response to a source broadcast read-modify (XRDMOD) request from the node 222. In particular, the node 222 allocates a source-broadcast protocol MAF entry (BP MAF) 234 to acquire a copy of the data. The node 222 then broadcasts the XRDMOD request to the network 220, including the nodes 224, 226 and 228. Since the owner node 226 is a cache ordering point for the requested data when it receives the XRDMOD request, the node 226 transitions from the M-state to the T-state and provides a corresponding ownership data response that includes D-data to the node 222.

The owner node 226 can also provide a BLOCK message to the home node in conjunction with providing the ownership data response. The home node 228 employs the BLOCK message to provide a non-data MISS response to the source node 222 when the BLOCK message can be matched with the associated transaction at the home node. In the absence of the BLOCK message finding a match at the home node 108, the home node would provide a memory copy of the requested data in response to the source broadcast request. The node 224 provides a FPP CONFLICT response to the XRDMOD request since the FPP MAF 230 is outstanding when the XRDMOD request is received. Since the node 222 receives the FPP CONFLICT response to the XRDMOD request, the node transitions from the I-state to the O-state after it has received a complete set of responses to the XRDMOD request. The transition to the O-state is in contrast to a situation when no FPP CONFLICT response is received and the node 222 can transition from the I-state to the D-state. In the D-state, the node 222 would have permission to modify the received data.

Since the node 226 is in the T-state when the node receives the PSNOOP request from the home node 228, the node 226 provides a T-CONFLICT response to the home node 208. The T-CONFLICT response informs the home node 228 that a cached copy of the data associated with the DIFT 232 may be more up-to-date than a copy in the memory. The potentially more up-to-data copy corresponds to the copy in the ownership data response (D-data) associated with the ordering point migration. Since the data at the memory or home node 228 may not be valid during an ordering point migration, the forward progress protocol causes the home node 228 to reissue the probe snoops (indicated at PSNOOP2) to the nodes 222 and 226.

In parallel with the T-CONFLICT response, the node 222 provides a MACK message to the owner node 226 acknowledging receipt of the ownership data response (D-DATA). The node 226 to transitions the T-state to the I-state as well as to provides a MACK-ACK message in response to the MACK from the node 222. After the node 222 receives the MACK-ACK response, the node 202 can retire the BP MAF 234, thereby enabling the node 222, as the new cache ordering point, to respond to subsequent requests for the data.

The node 222 subsequently allocates a FPP MAF 236 to reissue the read-modify request as a probe invalidate (PINVAL) command to the home node 228 using the forward progress protocol. The PINVAL command can be any type of command (e.g., an upgrade command) operative to provide a node with write permission for a read-only copy of data. In response to receiving the PINVAL request after the DIFT 232 had been retired, the home node 228 allocates another DIFT entry 238 for the same line of data. The home node 228, in turn, snoops the other nodes 224 and 226 with a corresponding snoop invalidate (PSNOOP INVAL) command. Since the PSNOOP INVAL command is to transfer write permission to the requesting node 222, the node 224 provides an MISS response to the home node 228 and transitions from the S-state to the I-state. The node 226, already in the I-state, also provides a MISS response to the home node 228. After receiving a complete set of the responses to the PSNOOP INVAL command, the home node 228 provides an acknowledgment message (ACK) to the node 222, and retires the DIFT entry 238. In response to receiving the ACK message, the node 222 transitions from the S-state to the E-state and retires the FPP MAF 236. In the E-state, the node 222 has permission to write the data (See, e.g., Table 1).

The PSNOOP2 command from the home node 228 is placed in a corresponding queue of the FPP MAF entry 236. The PSNOOP2 command corresponds to a snoop command from the home node for processing the PREAD request provided by the node 224 in the forward progress protocol. By queuing the PSNOOP2 command from the home node, the node 222 eventually provides a corresponding SNOOP_D response that includes a copy of the requested data. The SNOOP_D response is provided to the node 224 as well as to the home node 228. The home node 228 can then retire its DIFT entry 232 in response to receiving the SNOOP_D response from the node 222, which response indicates a cache hit at the node 222.

FIG. 6 depicts a multi-processor network 250 that includes a plurality of processor nodes 252, 254 and 256 and a home node 258. Initially, the processor nodes 252 and 254 are in the I-state and the processor node 256 is in the M-state, which defines the node 256 as a cache ordering point for requests for the data in the broadcast-based protocol. In the example of FIG. 6, the node 254 allocates a FPP MAF entry 260 and issues a corresponding PREAD request to the home node 258. The home node 258 allocates a DIFT entry 262 in response to the PREAD request from the source node 254. After allocating the DIFT entry 262, the home node 258 issues a corresponding PSNOOP to the other nodes 252 and 256. The node 252 provides a MISS response to the home node since it is in the I-state when it receives the PSNOOP. As shown in FIG. 6, the node 256, however, has transitioned from the E-state to the T-state and from the T-state to the I-state all prior to receiving the PSNOOP request from the home node.

After responding to the PSNOOP, the node 252 allocates a MAF entry (BPMAF) 264 to obtain a copy of the data employing the broadcast-based protocol. The node 252 broadcasts an XREAD request to the network 250, including the nodes 254, 256 and 258. The home node 258 receives the XREAD request while the DIFT entry 262 is active. Since the home node receives a request provided according to the source broadcast protocol while the DIFT entry is active, the home node sets a conflict condition (e.g., by setting a conflict bit). The circumstances associated with receiving all MISS responses when the conflict condition exists in the DIFT entry causes the entry to reissue the snoop from the home node, indicated at PSNOOP2.

Since the owner node 256 is a cache ordering point (M-state) for the requested data when it receives the XREAD request, the node 256 transitions from the M-state to the T-state and provides a corresponding ownership data response (D-data) to the node 252. The owner node 256 can also provide a BLOCK message to the home node 258 (indicated as a dotted line) in conjunction with providing the ownership data response. In the example, of FIG. 6, no blocking message matches with the transaction at the home node 258 such that the home node provides a memory data response (M-data) to XREAD request provided by the node 252. If the home would have matched the BLOCK message with the pending transaction at the home node (e.g., queued or while processing memory access), the home node would have provided a non-data MISS response (similar to the example of FIG. 4). The BP MAF entry 264 employs an optimization (e.g., a state machine) to determine which data response, the D-data or the M-data, to fill to the node's associated cache. In the instant case, the D-data overrides the M-data.

The node 252 also receives a FPP CONFLICT response from the node 254 since the FPP MAF 260 is outstanding when the XREAD request is received. In the example of FIG. 6, since the node 252 receives the FPP CONFLICT response to the XREAD request, the node 252 transitions from the I-state to the O-state after it receives a complete set of responses to the XREAD request. As mentioned herein, the transition to the O-state facilitates starvation avoidance since the protocol provides that the node 252 cannot modify a line of data while in the O-state.

The node 252 also provides a MACK message to the owner node 256 acknowledging receipt of the ownership data response (D-DATA). The MACK message enables the owner node 256 to transition from the T-state to the I-state. The node 256 then provides a MACK-ACK, after which the node 252 can retire the BP MAF 264 and respond to subsequent requests for the data as the new cache ordering point.

As mentioned above, the home node 258 reissues a PSNOOP2 to the nodes 252 and 256 in response to receiving all MISS responses and setting the conflict condition. The node 256, still being in the I-state, provides a corresponding MISS response to the home node 258. The node 252, being in the O-state, provides a SNOOP_D response to the home node 258 as well as to the node 254. The SNOOP_D response includes an up-to-date copy of the requested data. In response to providing the copy of data, the node 252 also transitions from the O-state to the S-state pursuant to state transition requirements of the forward progress protocol (See, e.g., Table 2). The home node 258 provides an acknowledgement ACK message to the node 254 in response to receiving the SNOOP_D response from the node 252 and retires the DIFT entry 262. After the node 254 receives the ACK message from the home node 258, the node 254 also retires the FPP MAF 260. In response to receiving the SNOOP_D response from the node 252, the node 254 also transitions from the I-state to the S-state. With the SNOOP_D response back to the home node 258, the ordering point for the data has effectively migrated from the cache of the node 252 to the home node 258.

In view of the above, those skilled in the art will understand and appreciate that the coherency protocols described herein facilitate concurrent interactions between different protocols, including during migration of ordering points from the cache of one processor to the cache of another processor. In particular, the hybrid protocol utilizes a T-conflict response which triggers a corresponding transition state in the forward progress protocol to help ensure that a requesting processor employing the forward progress protocol does not acquire stale data from memory, including during migration of cache ordering point. As mentioned above, a home node can reissue a snoop for data requested by the requesting processor when a conflict condition is detected and no copy of the requested data is return to the home node as well as when a T-conflict response is received to a corresponding snoop from the home node.

Figure 7:
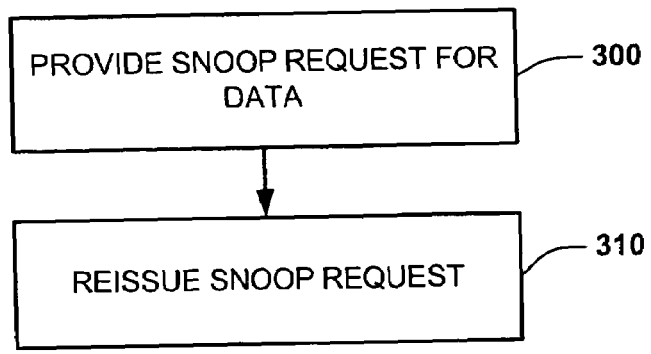

FIG. 7 depicts a method that includes providing a snoop request for data from a home node in response to a request for the data in a forward progress protocol, as shown at 300. The method also includes reissuing the snoop request from the home node in response to receiving a response at the home node associated with migration of an ordering point from cache of a second processor, as shown at 310.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
a home node that receives a first request for data from a first node according to a first cache coherency protocol and provides a second request for the data based on the first request;
and a second node that provides a conflict response to the second request, the conflict response indicating that an ordering point for the data is migrating according to a second cache coherency protocol, which is different from the first cache coherency protocol.

2. The system of claim 1, wherein the home node provides a retry request associated with the second request for the data in response to the conflict response from the second node.

3. The system of claim 1, wherein second node has a transition state associated with the data in response to sending an ownership data response to a third node, the second node providing the ownership data response to a source broadcast request provided by the third node according to the second cache coherency protocol.

4. The system of claim 1, wherein the first cache coherency protocol comprises a forward progress cache coherency protocol.

5. The system of claim 1, wherein each of the first and second nodes comprises a respective processor having an associated cache that comprises a plurality of cache lines, each of the first and second nodes being programmed to facilitate interaction between the first protocol and the second protocol during migration of the ordering point from the cache of the second node to the cache of the first node.

6. The system of claim 2, wherein, in response to the retry request associated with the second request, the home node and the first node each receives a response that includes a copy of the data which completes the request for the data from the first node according to the first cache coherency protocol.

7. The system of claim 3, wherein the second node comprises a processor having an associated cache that comprises a plurality of cache lines, one of the cache lines of the associated cache containing the data in the transition state.

8. The system of claim 3, wherein the third node transitions to a second state associated with the data in response to receiving the ownership data response from the second node, the second state defining the first node as a new cache ordering point for the data.

9. The system of claim 4, wherein the forward pro cress protocol comprises one of a null-directory cache coherency protocol and a directory-based cache coherency protocol.

10. The system of claim 4, wherein the second cache coherency protocol comprises a source broadcast cache coherency protocol.

11. The system of claim 8, wherein the third node provides an acknowledgment signal to the second node, the second node transitions from the transition state to an invalid state in response to receiving the acknowledgement signal.

12. A multi-processor computer system comprising:
a home node provides at least one snoop to obtain a copy of a line of data in response to a request provided by a first processor in a forward progress protocol, the home node reissues the at least one snoop when another copy of the line of data exists in the system associated with a broadcast-based protocol and no copy of the line of data is returned in response to the request provided by the first processor in the forward progress protocol, the another copy of the line of data being at least as up-to-date as the line of data in memory associated with the home node.

13. The system of claim 12, further comprising a second processor having an associated cache that includes the line of data in a cache line having a state indicative of migration of a cache ordering point for the line of data from the second processor to a third processor according to the broadcast-based protocol.

14. The system of claim 12, wherein the forward progress protocol comprises one of a null-directory cache coherency protocol and a directory-based cache coherency protocol.

15. The system of claim 12, wherein each of the home node and the first processor receives a response that includes a copy of the line of data to complete the request provided by the first processor in the forward progress protocol.

16. The system of claim 12, wherein the home node sets a conflict condition based on at least one of receiving a request for the line of data provided by another node according to the broadcast-based protocol and receiving a conflict response to the home node provided in response to the at least one snoop provided by the home node, the home node reissuing the at least one snoop in response to setting the conflict condition.

17. The system of claim 13, wherein the second processor transitions the cache line thereof to the associated state in response to providing an ownership data response to a source broadcast request issued by the third processor in the broadcast-based protocol.

18. The system of claim 13, wherein the second processor provides a conflict response to the home node in response to the at least one snoop provided by the home node, the home node reissues the at least one snoop based at least in part on the conflict response.

19. A multi-processor computer system, comprising:
a first processor that provides a first request for data to a home node employing a forward progress cache coherency protocol;
the home node provides a snoop request for the data to at least a second processor and to an owner processor based on the first request;
the second processor provides a miss response to the snoop request, and thereafter provides a source broadcast request for the data employing a broadcast-based cache coherency protocol; and
the owner processor comprises an associated cache that includes the data in a cache line having a first state that defines the owner processor as an ordering point for the data, the owner processor receives the source broadcast request prior to the snoop request from the home node, the owner processor providing an ownership data response to the source broadcast request and transitioning from the first state to a transition state associated with the data, the owner processor providing a conflict response to the home node in response to receiving the snoop request while having the transition state associated with the data, the home node reissues the snoop request for the data in response to the conflict response from the owner processor.

20. The system of claim 19, wherein the second processor transitions to a second state in response to receiving the ownership data response from the owner processor, the second state defining the second processor node as a new cache ordering point for the data.

21. The system of claim 19, wherein the owner processor further comprises a cache having a plurality of cache lines, one of the plurality of cache lines containing the data in the transition state.

22. The system of claim 19, wherein the forward progress cache coherency protocol comprises one of a null-directory cache coherency protocol and a directory-based cache coherency protocol.

23. The system of claim 20, wherein the second processor provides an acknowledgment signal to the owner processor, the owner processor transitions from the transition state to an invalid state in response to receiving the acknowledgement signal.

24. The system of claim 20, wherein, in response to the snoop request reissued by the home node, the second processor provides a response to each of the home node and the first processor that includes a copy of the data to complete the first request for the data.

25. A system, comprising:
means for transitioning a cache state for data at a first processor node from an ownership state to a transition state associated with migration of an ordering point for the data from the first processor node in response to a request for the data according to a first cache coherency protocol;
means for issuing a first snoop from a borne node to request the data from at least the first processor node according to a second cache coherency protocol, the second cache coherency protocol being different from the first cache coherency protocol; and
means for issuing a second snoop from the home node to request the data from at least the first processor node in response to setting a conflict condition at the home node based on responses to the first snoop received at the home node.

26. The system of claim 25, wherein the request for the data in a first cache coherency protocol is provided by a second processor node, the second processor node providing a miss response to the first snoop to the home node, the second processor node also providing a response to the second snoop to the home node and to a third processor node, the response to the second snoop including a copy of the data.

27. The system of claim 25, wherein the first cache coherency protocol comprises a source broadcast cache coherency protocol.

28. The system of claim 27, wherein the second cache coherency protocol comprises one of a null-directory cache coherency protocol and a directory-based cache coherency protocol.

29. The system of claim 26, further comprising means for providing a request for the data from the third processor node to the home node according to the second cache coherency protocol, the first snoop and the second snoop being issued by the home node in response to the request for the data from the third processor node.

30. The system of claim 26 further comprising means for providing a migration acknowledgment signal to acknowledge receipt at the second processor node of an ownership data response provided by the first processor node and for transitioning to a cache state at the second processor node that defines the second processor node as a new cache ordering point for the data.

31. A method comprising:
providing a snoop request for data from a home node in response to a request for the data according to a forward progress protocol; and
reissuing the snoop request from the home node in response to receiving a response at the home node associated with migration of an ordering point from a cache of a first processor to a cache of a second processor.

32. The method of claim 31, further comprising providing a source broadcast request from the second processor to the first processor for the data according to a broadcast-based protocol, the ordering point migrating in response to the source broadcast request for the data.

33. The method of claim 32, further comprising:
providing an ownership data response from the first processor in response to the source broadcast request for the data; and
transitioning a state associated with the data at the first processor from an owner state to a transition state associated with the migration of the ordering point.

34. The method of claim 33, further comprising transitioning a state associated with the data at the second processor that provided the source broadcast request for the data to a second state in response to receiving the ownership data response, the second state defining the second processor as a new cache ordering point.

35. The method of claim 34, further comprising providing a response from the second processor to the reissued snoop request that includes a copy of the data, the response to the reissued snoop request being provided to the home node and to a third processor that provided the request for the data according to the forward progress protocol.

* * * * *

UNITED STATES PATENT AND TRADEMARK OFFICE
CERTIFICATE OF CORRECTION

PATENT NO. : 7,395,374 B2
APPLICATION NO. : 10/760651
DATED : July 1, 2008
INVENTOR(S) : Gregory Edward Tierney et al.

It is certified that error appears in the above-identified patent and that said Letters Patent is hereby corrected as shown below:

On the title page, in item (73), under "Assignee", in column 1, line 1, after "Hewlett-Packard" insert -- Development --.

In column 15, line 52, delete "DIEFT" and insert -- DIFT --, therefor.

In column 16, line 4, delete "DIEFT" and insert -- DIFT --, therefor.

In column 22, line 31, in Claim 9, delete "pro cress" and insert -- progress --, therefor.

In column 24, line 4, in Claim 25, delete "borne" and insert -- home --, therefor.

In column 24, line 34, in Claim 30, after "claim 26" insert -- , --.

In column 24, line 41, in Claim 31, delete "comprising;" and insert -- comprising: --, therefor.

Signed and Sealed this

Seventh Day of October, 2008

JON W. DUDAS
*Director of the United States Patent and Trademark Office*